(12) United States Patent
Fukuzawa et al.

(10) Patent No.: US 7,701,935 B2
(45) Date of Patent: Apr. 20, 2010

(54) DATA COMMUNICATION BETWEEN NETWORKS USING RELAY DEVICES

(75) Inventors: Shoji Fukuzawa, Kawasaki (JP);
Atsushi Shimizu, Kawasaki (JP);
Masato Hayashi, Sagamihara (JP);
Susumu Matsui, Machida (JP)

(73) Assignee: Hitachi, Ltd., Tokyo (JP)

( * ) Notice: Subject to any disclaimer, the term of this patent is extended or adjusted under 35 U.S.C. 154(b) by 505 days.

(21) Appl. No.: 11/605,888

(22) Filed: Nov. 28, 2006

(65) Prior Publication Data
US 2007/0153716 A1 Jul. 5, 2007

(30) Foreign Application Priority Data

Jan. 4, 2006 (JP) .............................. 2006-000021
Oct. 3, 2006 (JP) .............................. 2006-271370

(51) Int. Cl.
*H04L 12/28* (2006.01)
(52) U.S. Cl. ..................................................... 370/389
(58) Field of Classification Search .......... 370/389–392
See application file for complete search history.

(56) References Cited

U.S. PATENT DOCUMENTS

| 7,006,453 | B1 * | 2/2006 | Ahmed et al. ............... 370/255 |
| 2003/0028668 | A1 * | 2/2003 | Garcia-Luna-Aceves et al. .......................... 709/238 |
| 2005/0053003 | A1 * | 3/2005 | Cain et al. .................. 370/235 |

FOREIGN PATENT DOCUMENTS

JP  2005-148956 A  6/2005
JP  2005-236598 A  9/2005

OTHER PUBLICATIONS

Giordano et al, Position Based Routing Algorithm for Ad Hoc Networks; A Taxonomy, 2003.*
Basangi et al, A Distance Routing Effect Algorithm for Mobility (DREAM), Mobicom (ACM), 1998.*
Comer, Internet Protocol With TCP/IP, vol. 1, Jun. 2005.*
Stojmenovic et al, Depth First Search and Location Based Localized Routing and QoS Routing in wireless networks, 2000.*
Leon et al, Communication networks, copyright 2000.*
Sanzgiri et al, Authenticated Routing for Ad Hoc Network, 2005.*

* cited by examiner

*Primary Examiner*—Pankaj Kumar
*Assistant Examiner*—Gautam Sharma
(74) *Attorney, Agent, or Firm*—Townsend and Townsend and Crew LLP

(57) ABSTRACT

A first and a second terminal carry out radio communications, the first terminal selects, based on an expectation saved in the concerned first terminal, a relay terminal relaying data to be transmitted to the second terminal and transmits the data, with a first information item indicating the address of the first terminal and a second information item indicating the address of the second terminal, to the relay terminal; and the relay terminal transmits the received first and second information items, and the data, to the second terminal; and if the second terminal receives the first and second information items, and the data, it transmits a completion report to the first terminal, based on expectation values saved by the second terminal concerned, making it capable of checking whether it has been possible to surely send and deliver the data.

30 Claims, 9 Drawing Sheets

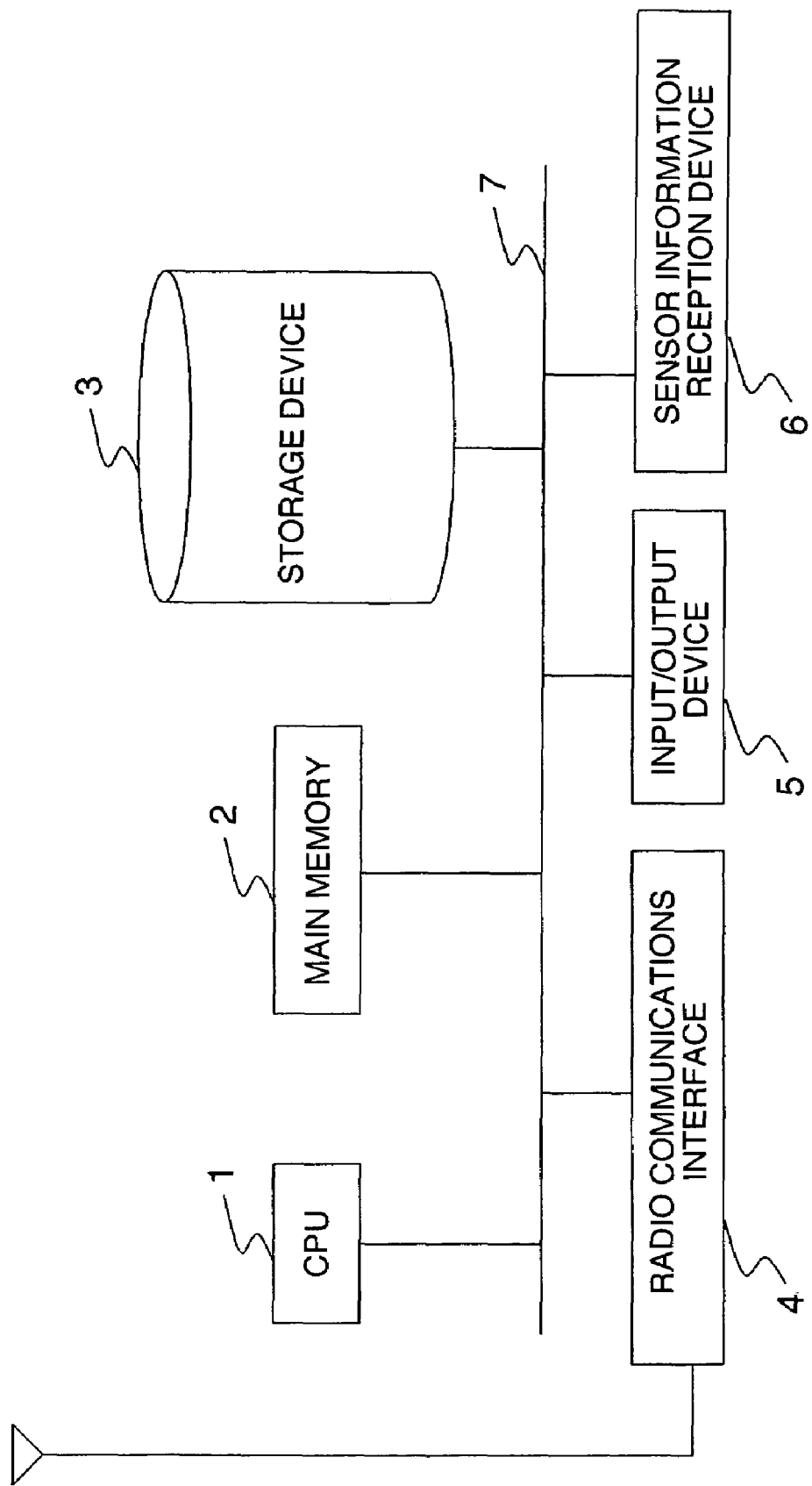

FIG. 3A

| DESTINATION | TRANSMISSION DESTINATION | EXPECTATION |
|---|---|---|
| TERMINAL 23 | — | 0 |

FIG. 3B

| DESTINATION | TRANSMISSION DESTINATION | EXPECTATION |
|---|---|---|
| TERMINAL 23 | — | 40 |
| | TERMINAL 25 | 80 |

FIG. 3C

| DESTINATION | TRANSMISSION DESTINATION | EXPECTATION |
|---|---|---|
| TERMINAL 21 | — | 80 |
| TERMINAL 23 | — | 80 |

FIG. 3D

| IDENTIFIER@TRANSMISSION SOURCE | TOTAL LENGTH, HEAD POSITION ~ PARTIAL LENGTH | DESTINATION |
|---|---|---|
| FILE 1@TERMINAL 21 | 1 MEGABYTE IN TOTAL, 0TH BYTE ~ 1 MEGABYTE | TERMINAL 23 |

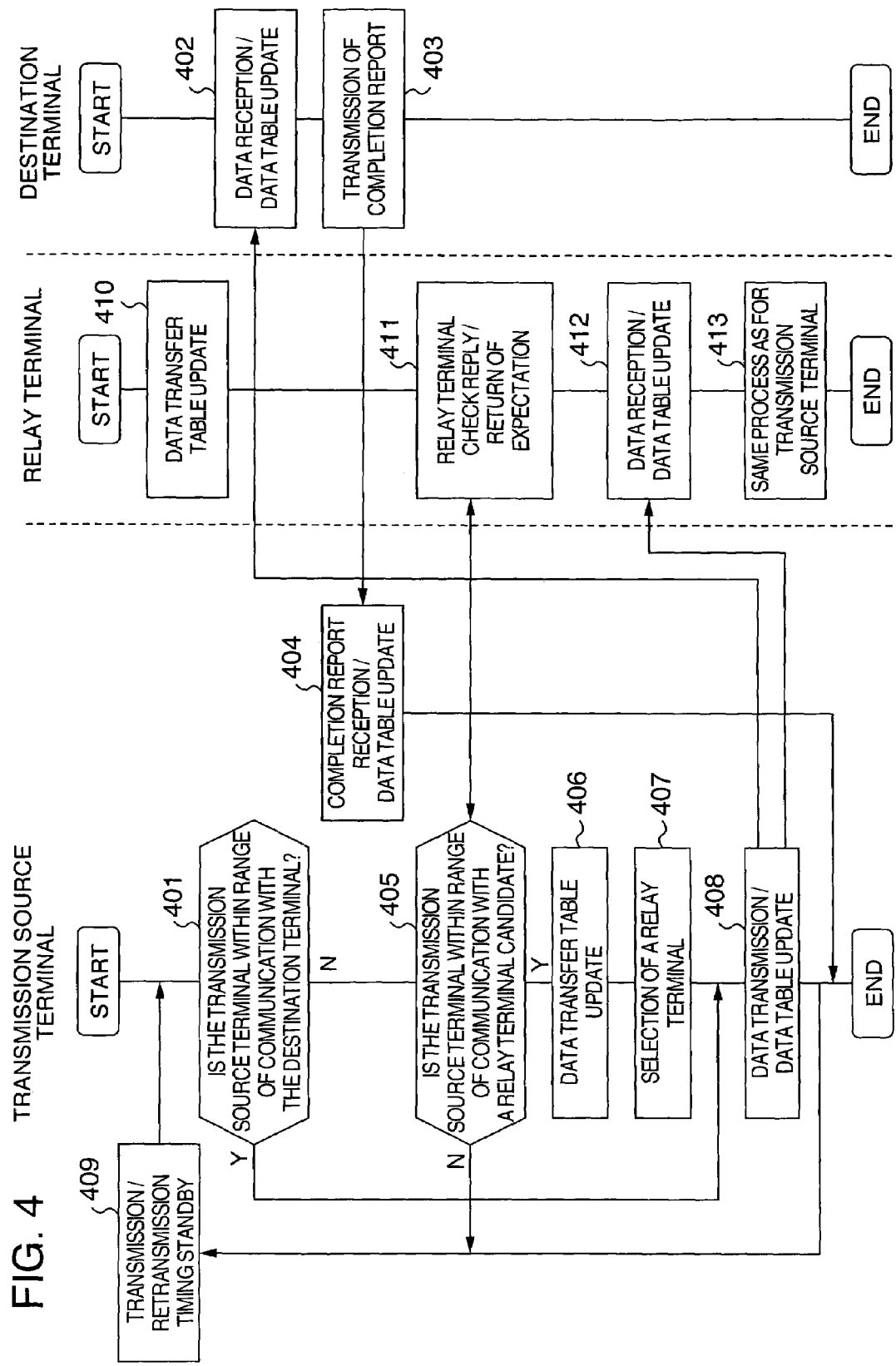

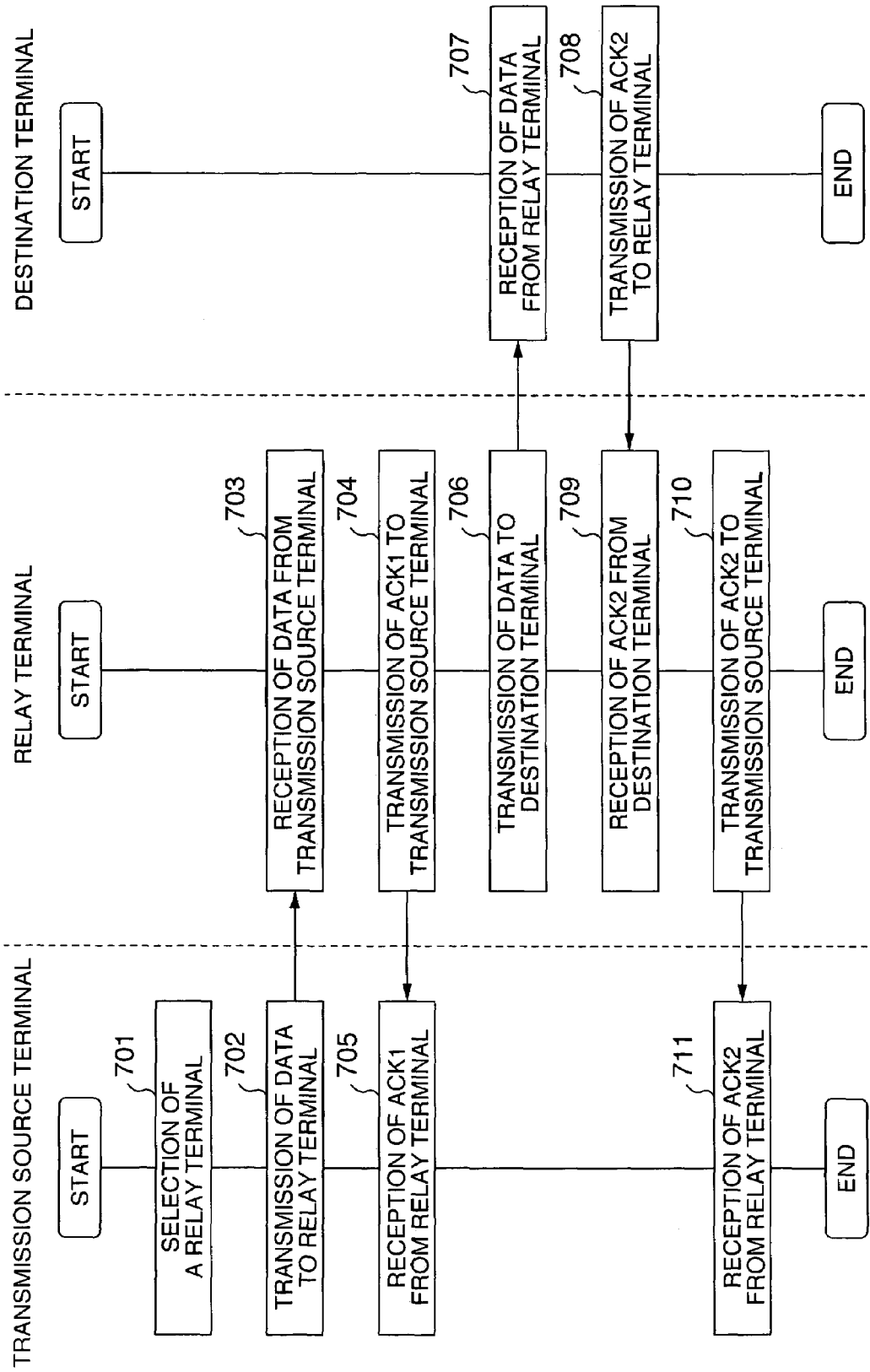

DATA COMMUNICATION BETWEEN NETWORKS USING RELAY DEVICES

INCORPORATION BY REFERENCE

The present application claims priority from Japanese applications JP2006-271370 filed on Oct. 3, 2006 and JP2006-000021 filed on Jan. 4, 2006, the contents of which are hereby incorporated by reference into this application.

BACKGROUND OF THE INVENTION

The present document pertains to technology performing radio communications.

Recently, technologies in which no communications infrastructure such as radio base stations is present and in which communications are carried out between radio terminals only (ad-hoc networks) has been studied. Regarding ad-hoc networks, specification investigations and standardization are carried out centered on the MANET (Mobile Ad-hoc NETworks) Working Group of the IETF (Internet Engineering Task Force), there being not only direct communications between mobile terminals (single hop) but also communications carried out via one or several other terminals (multihop).

However, in case a mobile terminal leaves the range of the whole network due to movement or the like, there exists an interval during which communication becomes impossible. As against this, there are technologies in which, when data are transferred from a source terminal transmitting data (hereinafter called the "transmission source terminal") to the destination terminal to which data are sent and delivered (hereinafter called the "destination terminal"), a terminal A (below called the "relay terminal") to which data have been distributed from the transmission source terminal and which relays data, searches for a relay terminal B to which the data should next be distributed, distributes the data, and the data are sent and delivered all the way to the destination terminal while relaying data among terminals.

Also, there are electronic mail systems performing data transfers to specific terminals. In an electronic mail system, the transmission source terminal specifies the destination terminal. Next, the transmission source terminal performs data transfer taking another terminal to be a relay terminal, on the basis of network topology information and the like possessed in advance, and subsequently requests data transfer to the concerned relay terminal. There are also cases of carrying out an error report to the transmission source terminal or the transferring relay terminal in case the data transfer is unsuccessful. Moreover, there are also cases where the destination terminal receiving the data reports an acknowledgment that the data have been received to the transmission source terminal.

SUMMARY

In an ad-hoc network, it is possible, in addition to multihop communication, to transfer data from a transmission source terminal with respect to a plurality of terminals satisfying the conditions as relay terminals, but there is the problem that it is not possible to acknowledge whether the data have for certain been sent and delivered to a specific terminal.

According to electronic mail systems, it is possible to acknowledge whether data have for certain been sent and delivered from a transmission source terminal all the way to the destination terminal, but these are not systems taking into account networks which, like ad-hoc networks, have a dynamically changing topology.

Accordingly, it is an object of the present invention to provide a system which, in a network having a dynamically changing topology, transfers data, and is capable of acknowledging whether the data have for certain been sent and delivered, from a transmission source terminal all the way to a destination terminal.

In order to solve the aforementioned problem, a desirable mode of the present invention is as follows.

In a network system in which a first and a second terminal carry out radio communications, the first terminal selects a relay terminal relaying data to be transmitted to the second terminal on the basis of the expectation held by the concerned first terminal and transmits the data, together with a first piece of information indicating the address of the first terminal and a second piece of information indicating the address of the second terminal, to the relay terminal; the relay terminal transmits the received first and second pieces of information, as well as the data, to the second terminal; and the second terminal receives the first and second pieces of information, as well as the data, and transmits a completion report to the first terminal on the basis of the expectation held by the concerned second terminal.

BRIEF DESCRIPTION OF THE DRAWINGS

FIG. 1 is a terminal hardware block diagram;

FIGS. 3A, 3B, and 3C are diagrams showing data transfer tables and FIG. 3D is an example of a data table;

FIG. 4 is a data transfer flow chart;

FIG. 7 is a diagram showing the data transmission operation of each terminal;

DESCRIPTION OF THE EMBODIMENTS

Figure 2A:
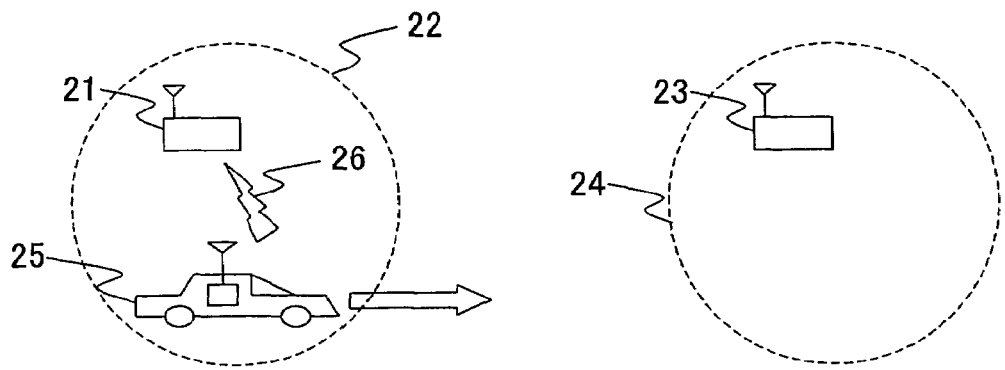
FIGS. 2A, 2B, and 2C are diagrams showing an example of a situation in which data transfer is carried out.

Hereinafter, an explanation of the embodiments is given using the drawings.

First Embodiment

FIG. 1 is a terminal hardware block diagram.

The concerned terminal is composed of a CPU (Central Processing Unit) 1, a main memory 2, a non-volatile storage device 3, a radio communications interface 4 carrying out transmission and reception of data with other terminals by means of radio communications, an input/output device 5 (display, loudspeaker, touch panel, or the like) governing the input/output between a speaker/viewer, an operator, and the like, and a sensor information reception device 6 (speed sensor, movement distance sensor, GPS, and the like), these being connected by means of a communication line 7 such as a bus.

CPU 1 carries out various processes by loading programs stored in storage device 3 into main memory 2 and executing the same. These programs and data may be stored in advance in storage device 3, may be input from a storage medium such as a CD-ROM, or may be downloaded from another device via the network. Also, the functions implemented by means of the concerned programs may also be implemented by means of dedicated hardware.

Figure 2B:
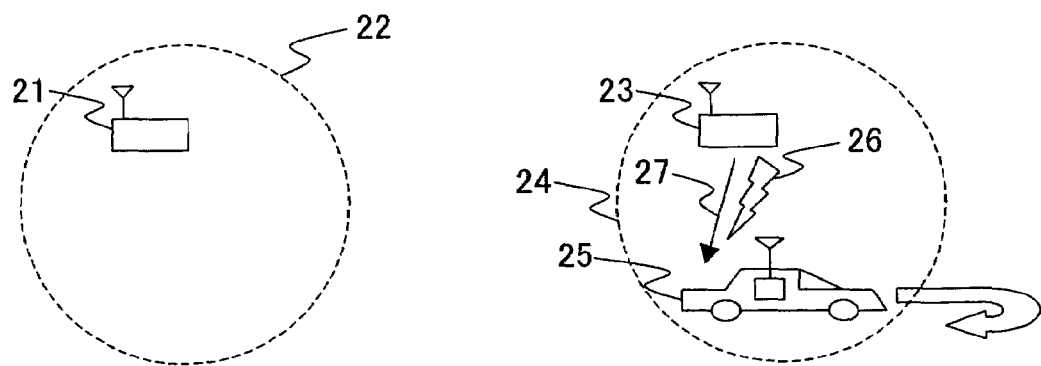
Figure 2C:
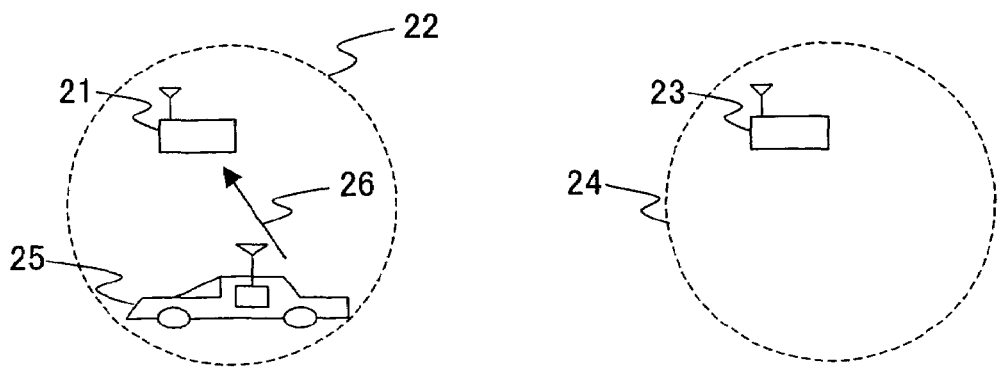

FIGS. 2A, 2B, and 2C are diagrams showing an example of a situation in which data transfer is carried out. Here, an explanation will be given regarding a situation in which terminal 21 inside ad-hoc network 22 transmits data to terminal 23 inside ad-hoc network 24.

In FIG. 2A, terminal 21 transmits data 26 by radio to terminal 25 (here a motor vehicle) present in the vicinity. Motor vehicle 25 is moving in the direction of ad-hoc network 24.

In FIG. 2B, motor vehicle 25 has entered ad-hoc network 24. Since at this stage, motor vehicle 25 has become capable of radio communication with terminal 23, the held data 26 are sent from terminal 21 to terminal 23. Terminal 23, having received data 26, transmits a completion report 27 acknowledging that data 26 have been received, to motor vehicle 25. And then, motor vehicle 25 makes a U turn in the direction of ad-hoc network 22.

In FIG. 2C, motor vehicle 25, having returned to ad-hoc network 22, transmits a completion report 27 to terminal 21. Further, the terminal transferring the completion report may be a terminal other than motor vehicle 25. Also, if it is realized in advance that transmission source terminal 21 and destination terminal 23 will together carry out communications using a cellular communications network, the completion report may also be made by using the cellular communications network.

Due to the foregoing, since terminal 21 will receive a completion report from terminal 23, it is possible, when it cannot receive a completion report, to surely transfer the data for certain by retransmitting the data.

FIGS. 3A, 3B, 3C, and 3D are diagrams showing data stored in main memory 2 or storage device 3. The contents of the tables of FIGS. 3A, 3B, 3C, and 3D are described in accordance with the situation in FIGS. 2A, 2B, and 2C.

FIG. 3A shows the data transfer table held by terminal 21 before terminal 25 appears. In this case, destination 31 indicates terminal 23, but since terminal 21 and terminal 23 are attached to respective separate ad-hoc networks, the terminals cannot communicate directly. Consequently, expectation 33 with respect to terminal 23 becomes 0. Further, transmission destination 32 indicates a terminal relaying the data transfer between terminal 21 and terminal 23, but in this case, it is a blank column.

FIG. 3B shows the data transfer table held by terminal 21 after terminal 25 has appeared. In this case, since terminal 25, which is a relay terminal, has appeared, the probability that the data will reach terminal 23 increases, so expectation 33 is updated (here: to 40). Also, since the probability that it will be possible to transmit the data with respect to terminal 25 constituting transmission destination 32 is high, the expectation with respect to terminal 25 takes on a high value (here: 80).

FIG. 3C shows the data transfer table held by terminal 25. Since the probability is high that terminal 25 can transfer data to both terminal 21 and terminal 23, the expectation values for both take on high values (here: 80).

FIG. 3D shows an example of a data table. It consists of a data identifier 34, a transmission source 35, a total data length 36, a head position 37, a partial data length 38, and a destination 39.

Transmission destination 32 indicates the addresses of the transmission source terminal and a terminal/terminals with which communications are possible (a relay terminal or a destination terminal). Expectation 33 indicates the extent of correctness of the fact that the terminal handling the concerned destination transmits data to the destination terminal.

The expectation may be set in any way. E.g., the setting may be made on the basis of the history of communications with another terminal (which may be based on the table of communication paths occurring in the ad-hoc network) and the frequency thereof (e.g. the fraction of time, or the like, in the last 24 hours during which communications were possible). Also, in case the GPS coordinates of the destination terminal are already known and each terminal has information about the history of the variation of its own past GPS coordinates, information about the GPS coordinates of future linked destinations, and the like, the setting may be made by using the same information. Also, in case there appears newly a terminal with which communications have become possible and the concerned terminal moves in the direction of the ad-hoc network in which the destination terminal is present, the expectation may be set to be high.

Also, it is possible to consider that, compared to a terminal which in relative terms remains stationary in the surrounding region of the transmission source terminal with communications capability unchanged from earlier, the terminal with which communications have newly become possible has a high probability of being connected to a network which is different from that of the transmission source terminal. Based on a consideration like this, there may be set a higher expectation with respect to the terminal with which communications have newly become possible than for the terminal with which communications were possible from earlier. Further, in case a plurality of terminals with high expectation values are present, data transfer may be performed with respect to a plurality of terminals in order to raise the probability of arrival to the destination terminal.

Identifier 34 is a value for identifying data such as a file name, and it is possible to carry out actual file identification by combining the identifier with e.g. transmission source 35 (not only the transmission source terminal but also including relay terminals transmitting the same data. Also, in the transmission source terminal, the process may also be performed by setting identifier 34 to be unique inside the same terminal.

Total length 36 indicates the total length of the data to be transmitted by the transmission source terminal to the destination terminal.

Head position 37 indicates the head position of the partial data (an offset value indicating where the head position of the partial data lies, taking the head position of the total data as a reference) in the case where the data are partitioned and have become partial data.

Partial length 38 indicates the size of the partial data. In case the data are partitioned, and head position 37 has an offset of 0, partial length 38 becomes equivalent to total length 36.

Destination 39 indicates the final destination (destination terminal) of the data. Further, the data that will be transmitted and received are themselves associated with identifier 34 (or the combination of identifier 34 and transmission source 35) of storage device 3 or main memory 2, and stored.

FIG. 4 is a data transfer flow chart.

Hereinafter, an explanation will be given while comparing with FIG. 2. Further, the core of the processes is explained as being in the terminal, but it goes without saying that the core in the case of implementing the concerned processes in software is CPU 1 which executes the programs.

First, terminal 21 checks whether the destination terminal is within communication range 22 of the transmission source terminal (Step 401). In case it is within the communication range (since there is no overlap of the respective terminal communication ranges 22 and 24 in FIG. 2, direct communication is not possible), terminal 21 takes the transfer destination to be the destination terminal, transmits the data to the destination terminal, and updates (or makes a new registration for) the data table held internally (Step 408). The destination terminal receives this, and as the need arises (the data reception situation does not have to be stored in case all the data are received in one reception) updates (or makes a new registration for) the data table (Step 402). And then, it transmits a completion report to the transmission source terminal (Step 403), the transmission source terminal receives the concerned report and updates (or deletes, in the case of completion of the transmission of all the data) the data table (Step 404) and terminates the process.

In case the destination terminal is not within communication range 22 in Step 401, it is checked whether destination terminal 23 and one or several relay terminal candidates expected to become capable of future communications can communicate (Step 405). Further, a continuous update of the data transfer table is carried out on the relay terminal side in accordance with changes in the table of communication paths or the GPS positions (Step 410), and, in reply to this during the check of the transmission source terminal, the expectation of the terminal itself toward the destination terminal is returned (Step 411). In case the transmission source terminal is able to communicate with one or several relay terminal candidates, the data transfer table is updated on the basis of the expectation values etc. up to the destination terminal of each relay terminal, acquired during the check (Step 406), and a relay terminal (terminal 25 in FIGS. 2A, 2B, and 2C) is selected from among the relay terminal candidates (Step 407). In case there is no possibility of communication, the transmission source terminal carries out operations like setting a timer and waits for the next transmission timing (Step 409), and, in case the transmission timing has been reached, the processes from Step 401 are repeated.

The transmission source terminal carries out data transfer to the selected relay terminal and updates (or makes a new registration of) these data in the data table (Step 408) and holds the data until the arrival of the following completion report. Also, if the selected relay terminal also receives the transferred data, an update (or a new registration) of the concerned data are carried out (Step 412).

The relay terminal assigned to carry out relay of the data transfer in this way hereafter carries out the same processes as the transmission source terminal (Step 413) and transfers the data the moment communication becomes possible with destination terminal 23 or another relay terminal. Destination terminal 23 carries out the same processes as in the case of direct reception from transmission source terminal 21. The relay terminal may search for relay terminal candidates other than itself before communication becomes possible with the destination terminal and may hand over the data transfer role to such a terminal and a terminal which can be judged to have a higher expectation to be able to communicate with the destination terminal than the relay terminal itself. Also, in order to raise the probability of data arrival, the relay terminal may also continue to be a relay terminal while also selecting another relay terminal candidate as a relay terminal in addition and carry out the data transfer.

Further, with respect to a destination terminal present inside a limited communication area such as a Wireless LAN (Local Area Network) hotspot, in the case of carrying out data transfer from a transmission source terminal running through the concerned communication range, the data are partitioned in advance into a size which can be communicated during the time of running through the communication range and the transmission source terminal transfers the first partial data to the destination terminal and as for the remaining data, a terminal mounted in the following vehicle or a vehicle coming in the opposite direction is selected as a relay terminal, and the data are transferred. The relay terminal to which the data have been transferred transfers the head of the remaining partial data to the destination terminal and transfers the further remaining partial data to another relay terminal in the same way as mentioned before. By means of a repetition hereof, it is possible to carry out a transfer of all the data to the destination terminal.

Here, it is also acceptable for the transmission source terminal or the relay terminal, in case a plurality of different partial data having the same identifier are received, to judge from the head positions of the same partial data and the sizes of the same partial data whether a plurality of different partial data can be joined together, and, in case joining of the same partial data has been carried out, for the destination terminal to judge, on the basis of the concerned judgment, from the concerned joined data and the total size of the data whether reception of all the data has been completed, and in case the reception of all data has been completed, to transmit a completion report to the transmission source terminal.

Also, concerning the data transfer, it is also possible to transmit, together with the data, a certificate regarding the aforementioned data. A relay terminal receiving data with a certificate included can judge, by examining the validity of the certificate, whether an illicit process like misrepresenting the transmission source terminal or tampering with the data has not been carried out. Moreover, it is also possible, on the basis of being able to correctly designate the transmission source terminal, to carry out a judgment such as e.g. not relaying data received from a predetermined terminal. Regarding the method of examining a certificate and the validity thereof, any method is acceptable. E.g., a method such as having public keys of one or several authentication stations set in storage device 3 of each terminal and judging a certificate which can be correctly encoded using one out of these public keys to be a valid certificate would also be acceptable. Moreover, a method such as e.g. appending to the data, when the aforementioned public key is taken to be the first public key, a second public key which can be correctly encoded using the first public key and judging a certificate which can be correctly encoded with the second public key to be a valid certificate would also be acceptable.

Second Embodiment

Figure 5:
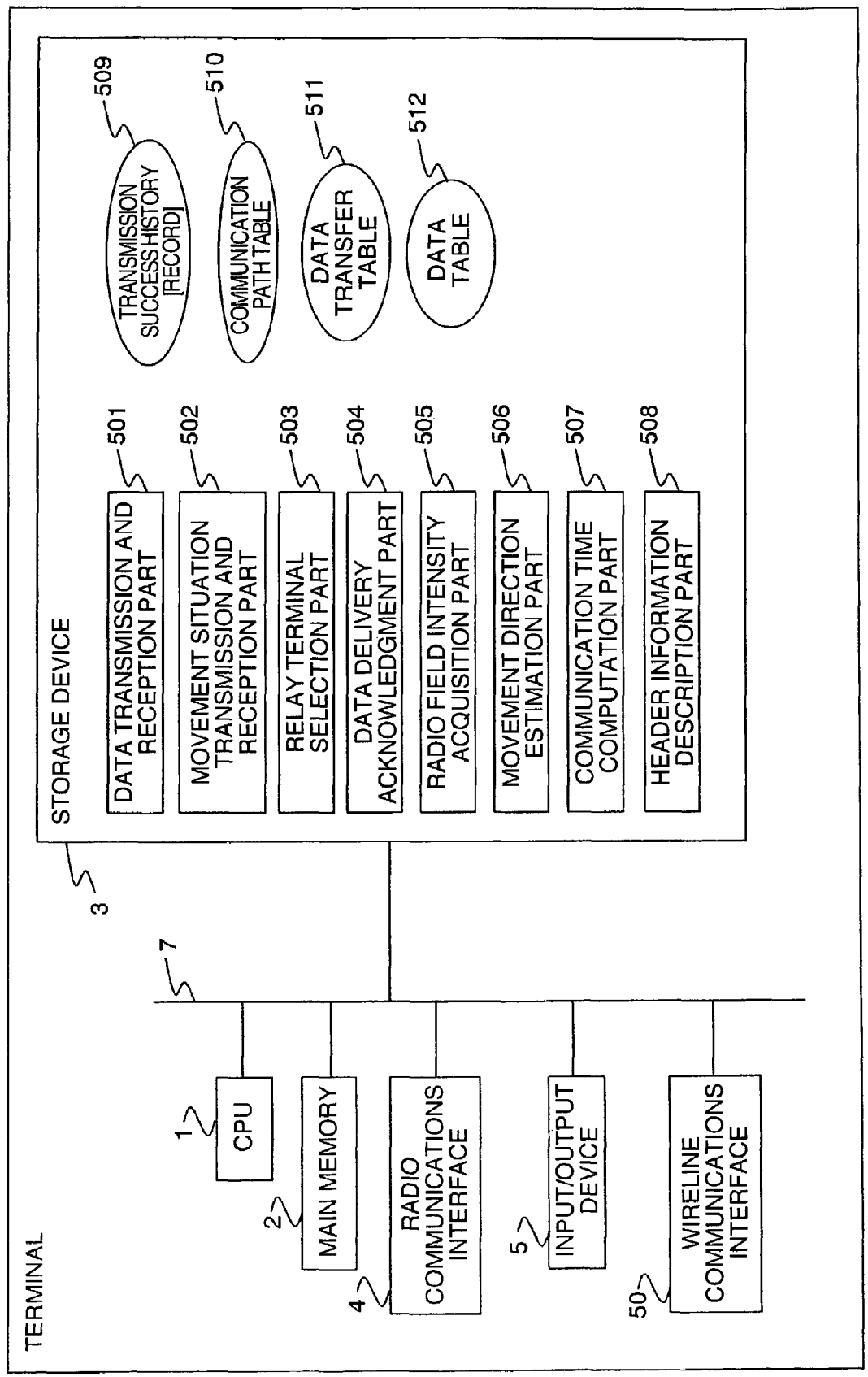
FIG. 5 is a terminal hardware block diagram.

FIG. 5 is a hardware block diagram of a terminal in Embodiment 2.

The terminal may have, in addition to the hardware shown in FIG. 1, a wireline communications interface 50 carrying out transmission to and reception from other computers by connecting to the Internet.

Storage device 3 stores the data of a data transmission and reception part 501, a movement situation transmission and reception part 502, a relay terminal selection part 503, a data delivery acknowledgment part 504, a radio field intensity acquisition part 505, a movement direction estimation part 506, a communication time computation part 507, and programs such as a header information description part 508, as well as of a transmission success history record 509, a communication path table 510, a data transfer table 511 (FIG. 3A), and a data table 512 (FIG. 3D).

Hereinafter, the programs are described as if they are the core carrying out action, but it goes without saying that the actual core carrying out actions is CPU 1 executing the same programs.

Figure 6A:
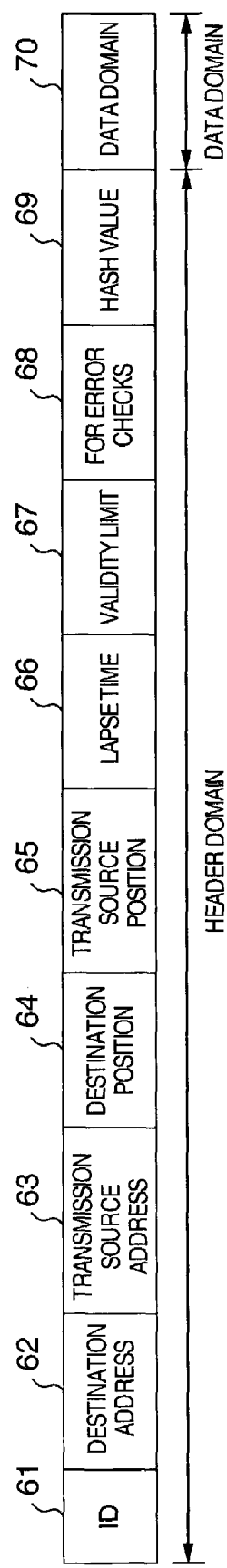
FIGS. 6A and 6B are diagrams showing data formats.

Data transmission and reception part 501 transmits and receives data to be sent and delivered from the transmission source terminal to the destination terminal (FIG. 6A).

Movement situation transmission and reception part 502 transmits information indicating the movement situation of the terminal itself (FIG. 6B) to other terminals and receives information indicating the movement situation of other terminals from the concerned other terminals.

Relay terminal selection part 503 selects a terminal with a high expectation, from among the terminals present in the neighborhood, as the relay terminal.

Data delivery acknowledgment part 504 carries out an acknowledgment of data delivery to the relay terminal or the destination terminal.

Radio field intensity acquisition part 505 acquires the intensity of radio waves emitted by other terminals.

Movement direction estimation part 506 estimates the movement directions of other terminals.

Communication time computation part 507 computes the time during which communication with other terminals is possible.

Header information description part 508 describes information based on transmission success history record 509 in the header domain of data that will be transmitted (FIG. 6A).

Transmission success history record 509 indicates information such as the transmission time situation, communication parameters, and the transmission success record.

Communication path table 510 shows route information indicating through which relay terminal the data passes to reach the destination terminal.

Data transfer table 511 and data table 512 are as described above (FIG. 3).

Figure 6B:
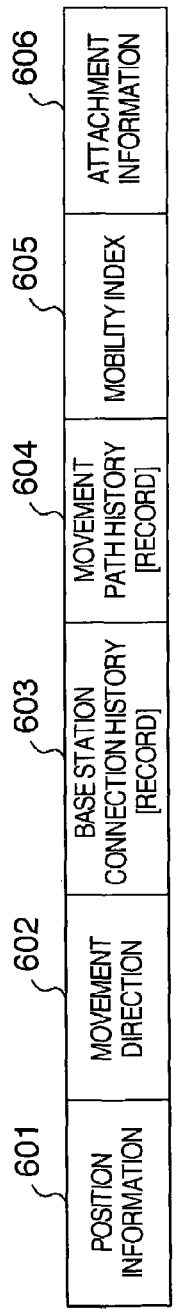

FIGS. 6A and 6B are diagrams showing data formats.

FIG. 6A is an example of data, composed of a header domain and a data domain, to be sent and delivered from the transmission source terminal to the destination terminal, the header domain consisting of ID 61 (sequence number, file name, data range, or the like), a destination address 62 indicating the address of the destination terminal (DST), a transmission source address 63 indicating the address of the transmission source terminal (SRC), a destination position 64 indicating position information about the destination terminal, a transmission source position 65 indicating position information about the transmission source terminal, a lapse time 66 indicating the difference between the time at which the data were transmitted and the present time, a validity period 67 indicating the period of validity of the data, a field for error checks 68 (CRC), and a Hash value 69.

FIG. 6B is an example of information indicating the movement situation of a terminal, which consists of position information 69 (GIS, GPS, or the like), a movement direction 602, a connection history record 603 of connections with base stations, a movement path history record 604, an index 605 judging the mobility (mobile terminal, fixed terminal, or the like), and attachment information 606 (attachment to a bus that is a circulating vehicle, to a railway train proceeding in a fixed direction, or the like).

FIG. 7 is a diagram showing a data transfer procedure.

Hereinafter, the information that will be transmitted in order to give an alert, regarding the fact that a terminal having received data from another terminal has received the data, to the concerned terminal is referred to as "ACK". Also, the ACK transmitted by the relay terminal is called ACK1 and the ACK transmitted by the destination terminal is called ACK2. Information such as position information about, and the direction of movement of, the terminal having received the data may be included in ACK.

Here, the position information of the destination terminal is described as known information (destination position 64).

Relay terminal selection part 503 of the transmission source terminal uses, in case direct communication cannot be established with the destination terminal (in case there is no destination terminal information in communication path table 510), movement direction estimation part 506, communication time computation part 507, and the like; selects from among the terminals in the neighborhood with which communication is possible a terminal having a high expectation (e.g. the terminal which is closest to the destination terminal in case great importance is attached to the proximity to the destination terminal as the expectation) as the relay terminal (Step 701); and transmits the data to the concerned relay terminal (Step 702). When receiving the data from the transmission source terminal (Step 703), the relay terminal transmits ACK1 to the transmission source terminal (Step 704), and the transmission source terminal receives ACK1 from the concerned relay terminal (Step 705). Further, in case direct communication can be established with the destination terminal (in case there is information about the destination terminal in communication path table 510), the data are transmitted directly to the destination terminal.

Next, in case the relay terminal is able to communicate directly with the destination terminal, the relay terminal communicates the data received from the transmission source terminal to the destination terminal (Step 706). If it receives the concerned data (Step 707), the destination terminal transmits ACK2 to the concerned relay terminal (Step 708), and if the relay terminal receives ACK2 from the destination terminal (Step 709), it transmits ACK2 to the transmission source terminal (Step 710), and the transmission source terminal receives ACK2 from the relay terminal (Step 711).

Data delivery acknowledgment part 504 judges, by means of receiving ACK, that the data have arrived at the relay terminal (or the destination terminal).

Further, if it has not received ACK after a fixed time (timeout time) has elapsed, the transmission source terminal (or the relay terminal) retransmits the data to the relay terminal (or the destination terminal) and, in case ACK is received before the timeout time has elapsed, resets the timeout time.

This reset can be carried out dynamically on the basis of the time elapsing until ACK2 reaches the transmission source terminal or a statistically processed result thereof. The data transmission processes that have become unnecessary as a result of this are suppressed, making possible an efficient transfer of data. Also, in case the relay terminal has not been able to transmit the data within the set time period, it may report an error to the transmission source terminal. Moreover, it may report an error via the cellular communications network.

In case the relay terminal having received the data is moving in a direction which is inappropriate for reaching the destination terminal or in case ACK is not returned, the transmission source terminal (or the relay terminal having transmitted the data) raises the expectation of the terminal having been selected as the current relay terminal and reselects as the relay terminal another terminal to be entrusted with the data as a result thereof and carries out a retransmission of the data.

In case a plurality of relay terminals are present between the transmission source terminal and the destination terminal, the plurality of relay terminals respectively carry out the relay terminal processes explained above, the result being that the data is transferred all the way to the destination terminal via a plurality of relay terminals.

When carrying out the completion report, the destination terminal transmits ACK to terminals that have high expectation values, in the same way as above. The destination terminal, as mentioned above, makes an update by setting the expectation values itself, using a car navigation system or the like, or makes an update by setting the expectation values on the basis of data received from terminals in the surrounding region.

Further, in case it is known that the transmission source terminal uses, together with the destination terminal, a cellular phone network, ACK may be transmitted via the cellular phone network from the destination terminal to the transmission source terminal. Since, for ACK, the data size is very small in comparison with the data in FIG. 6A, even if a cellular phone network which has associated communication costs is generally used, the costs are not so high. Consequently, even if there is no terminal with a high expectation in the surrounding region, it is possible to carry out the completion report for certain.

Figure 8A:
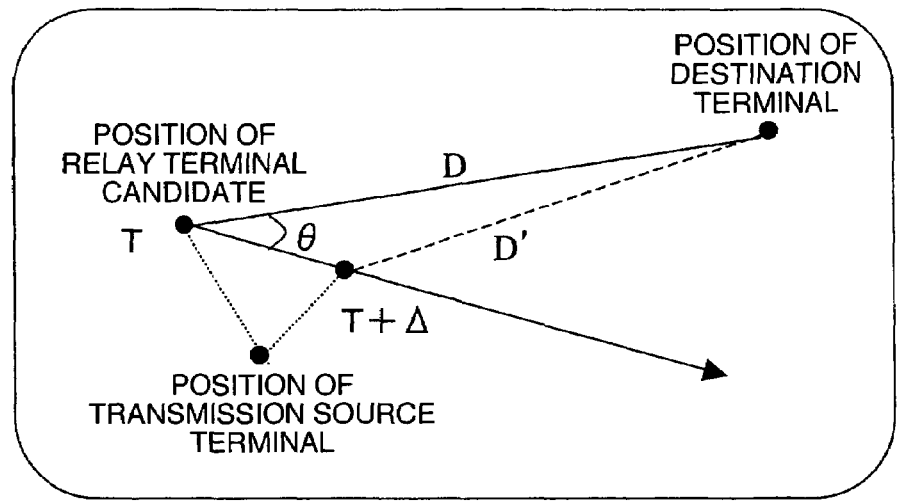
FIGS. 8A and 8B are explanatory diagrams of a method of estimating the direction of movement of a terminal.
Figure 8B:
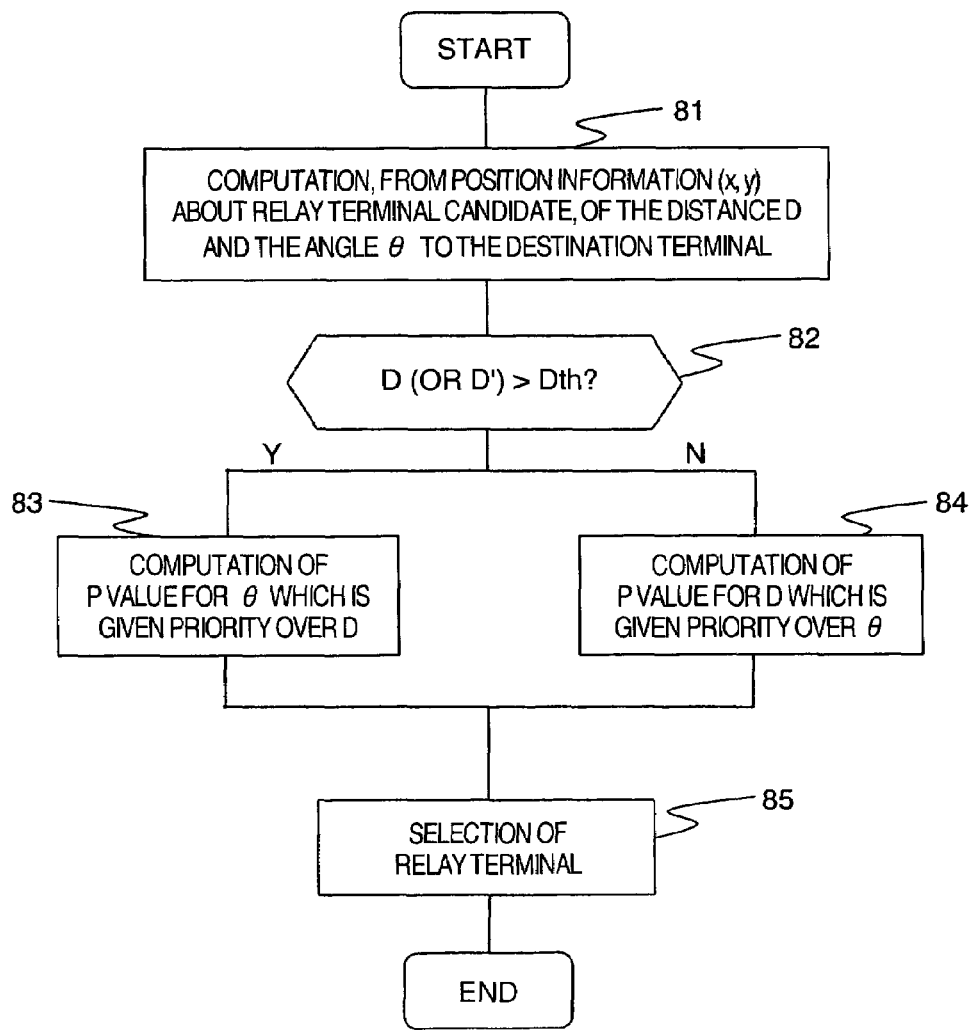

FIGS. 8A and 8B are diagrams for explaining a method of estimating the direction of movement of a terminal.

FIG. 8A is a diagram showing the positional relationship between a terminal serving as a relay terminal candidate (hereinafter called a relay terminal candidate) and the destination terminal, and FIG. 8B is a flowchart of movement direction estimation part 506.

Movement direction estimation part 506 computes, on the basis of position information about the relay terminal candidate received by movement situation transmission and reception part 502, the distance D from the relay terminal candidate to the destination terminal at time T, the distance D' from the relay terminal candidate to the destination terminal at time T+Δ, and the angle θ between the straight line joining the relay terminal candidate and the destination terminal at time T and the straight line indicating the traveling direction of the relay terminal candidate (Step 81). Further, the estimation part has, pre-saved in storage device 3 or the like, a function $P=\alpha \times \theta + \beta \times D$ ($\alpha$, $\beta$: parameters for weighting) for selecting a relay terminal.

Relay terminal selection part 503 judges whether D (or D') is greater than a threshold value Dth (Step 82) and in case D (or D')>Dth, varies α and β so as to give priority to θ over D and computes P (Step 83) and in case D (or D')≦Dth, varies α and β so as to give priority to D over θ and computes P (Step 84). And then, to select a relay terminal, the selection part gives priority to a terminal having a high value for P (Step 85). Here, Dth may be set in any way. E.g., it may be set on the basis of simulated results for various environments or it may be set dynamically in response to the area in which the terminal is moving. Also, the aforementioned algorithm is not one that is limited to this method.

Further, the movement direction of the terminal may also be estimated on the basis of geographical information such as the road of travel and traffic lane information (GIS information), attachment information for the terminal, changes in positional information, the movement history of the terminal, target location history information, information about the connection history with the base station, information about sensors such as GPS, and the like. Also, the movement direction may be estimated on the basis of changes in the intensity of radio waves emitted by other terminals and acquired by radio field intensity acquisition part 505. E.g., regarding the relationship between the inter-terminal distance and received radio field intensity (how much received radio field intensity is exhibited by the inter-terminal distance at what time), it is pre-saved as known data by each terminal. And then, it can be judged by means of the two values of the change in received radio field intensity and the change in distance, per unit time, whether the current inter-terminal distance is increasing or not.

And then, it is possible to have the results estimated by these methods reflected in the expectation. The terminal may also, by consulting the concerned expectation, e.g. transmit data, in case a terminal with an expectation exceeding a certain fixed value is present in the surrounding region, to the concerned terminal, and in case there is no such terminal, refrain from transmission of the data and wait for the emergence of a terminal having an expectation exceeding the certain fixed value.

Data transmission and reception part 501 of the relay terminal transmits data from its own terminal to another terminal, in case its own terminal is moving away from the destination terminal. Also, in case its own terminal is not moving away from the destination terminal, it refrains from data transmission from its own terminal to another terminal.

Figure 9:
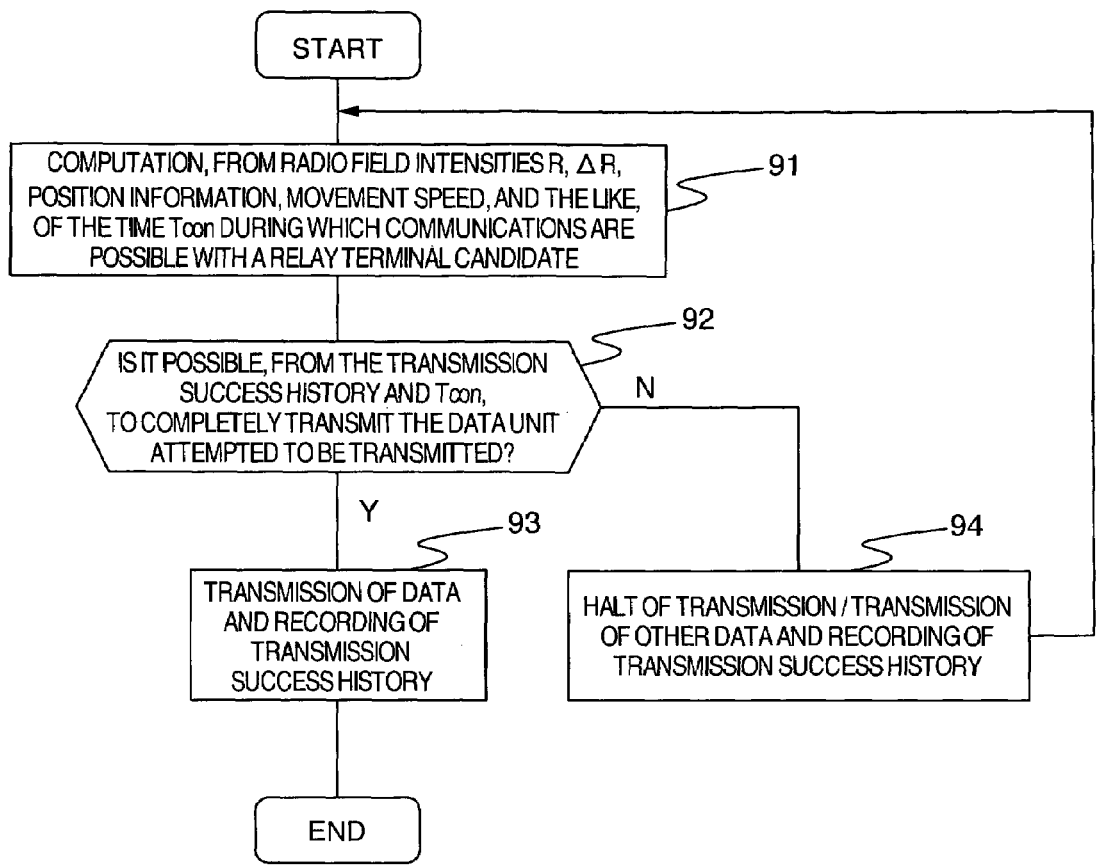
FIG. 9 is an explanatory diagram of a communication time computing part.

FIG. 9 is a flowchart of communication time computation part 507.

A terminal attempting data transmission computes, when selecting a relay terminal, the time during which communication is possible with the relay terminal candidate (the time during which connection is possible: Tcon), based on the intensity R of the received radio waves, the rate of change ΔR thereof, position information, the speed of movement, and the like (Step 91). This can also be computed, in the same way as mentioned above, on the basis of pre-saved known data regarding the relationship between the inter-terminal distance and the received radio field intensity, and the two values of respectively the received radio field intensity per unit time and the change in distance per unit time.

The terminal judges whether it is possible, within the computed time Tcon, to complete transmission to the relay terminal of the data unit attempted to be transmitted (Step 92), and in case it judges this to be possible, it attempts to transmit the data and stores the success/failure thereof, together with the situation during transmission and the transmission conditions, as transmission success history record 509 in storage device 3 (Step 93). If it judges that transmission completion is impossible, it halts the transmission or attempts transmission of other data (Step 94).

The terminal modifies the data transmission method (unicast, broadcast, or the like) during data transmission in response to the situation of the terminal itself and other terminals. In case the detailed current position of the destination terminal is unclear or in case the destination terminal is moving at high speed, the transmission source terminal carries out a broadcast with respect to terminals in the neighborhood with which communication is possible, in case the condition that the distance between the transmission source terminal (or the relay terminal) and the position at which the destination terminal was present at the outset (destination position 64) becomes smaller than a certain value, or the like, is satisfied.

Figure 10:
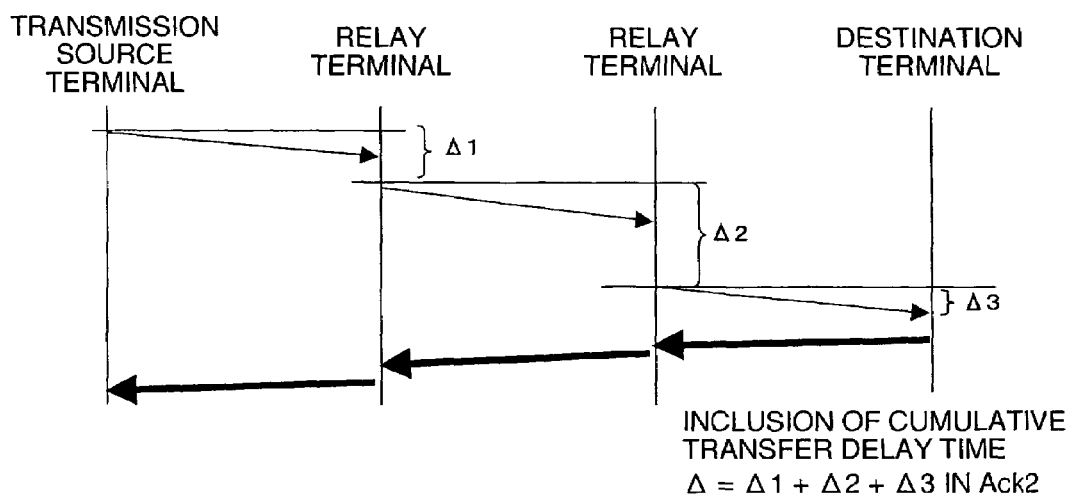
FIG. 10 is a flow control explanatory diagram.

FIG. 10 is a diagram for explaining the implementation of the flow control.

By transmitting, as an addition to the data, the transfer delay time accumulating in the data transfer between each terminal and including ACK2, it is possible for the transmission source terminal to find out about the time it takes for the data to arrive at the destination terminal. In response to this cumulative transfer delay time, it is possible, by adjusting the values of the packet size, the communication rate, the packet transmission period, and the like, to obtain the effect of avoiding congestion and so forth, together with being able to efficiently use resources such as buffers and CPUs.

According to the present document, it is possible, in an ad-hoc network with a dynamically changing topology, to provide a system by which data are transferred from a transmission source terminal all the way to a destination terminal and it can be acknowledged whether it has been possible to send and deliver the data for certain.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network system in which a first and a second terminal carry out radio communications, wherein:
   if said first terminal determines that there is no communication path between said first terminal and said second terminal, said first terminal determines if there are one or more relay terminals which are capable of communicating with said second terminal and obtains and saves expectation values for the one or more relay terminals, said expectation values indicating a probability of transmitting data to said second terminal from the one or more relay terminals;
   said first terminal selects, on the basis of said expectation values saved by said first terminal, a relay terminal relaying data to be transmitted to said second terminal and transmits said data, together with a first information item indicating the address of said first terminal and a second information item indicating the address of said second terminal, to said relay terminal;
   if said relay terminal determines that there is no communication path between the said relay terminal and said second terminal, said relay terminal checks to determine if there are relay terminals capable of communicating with the second terminal, and obtains and saves expectation values of said relay terminals, said expectation values indicating a probability of transmitting data from said relay terminals to the second terminal;
   said relay terminal selects, based on said expectation values saved by said relay terminal, another relay terminal to transmit data to said second terminal and transmits data, together with a first information item indicating an address of said relay terminal and a second information item indicating an address of said second terminal to said another relay terminal until said another relay terminal transmits the received said first information item and said second information item, and said data, to said second terminal;
   and said second terminal, if it receives said first and second information items, and said data, transmits a completion report to said first terminal, on the basis of an expectation value saved in said second terminal.

2. A network system according to claim 1, wherein:
   said relay terminal transmits the received first and second information items, and said data, via another relay terminal to said second terminal.

3. A network system according to claim 1, wherein:
   said first terminal associates expectation saved by said first terminal with the address of said relay terminal and stores said expectation.

4. A network system according to claim 1, wherein:
   said relay terminal sets an expectation of said relay terminal and transmits said expectation to said first terminal.

5. A network system according to claim 4, wherein:
   said relay terminal sets, on the basis of GPS information, expectation of said relay terminal.

6. A network system according to claim 1, wherein:
   said relay terminal, if it receives a completion report from said second terminal, transmits said completion report, on the basis of expectation saved by said relay terminal, to said first terminal.

7. A network system according to claim 6, wherein:
   said relay terminal transmits said completion report, via another relay terminal, to said first terminal.

8. A network system according to claim 1, wherein:
   said second terminal transmits completion report via a cellular communications network to said first terminal.

9. A network system according to claim 1, wherein:
   said relay terminal, in case it was not possible to transmit said data within the time period set for said data, reports an error to said first terminal.

10. A network system according to claim 9, wherein:
    said relay terminal reports the error via the cellular communications network.

11. A network system according to claim 1, wherein:
    said data include an identifier of said data, a total size, a value of the offset, from the head of said data, of the partial data that will be transferred, and the size of said partial data;
    said first terminal or said relay terminal receives a plurality of different said partial data having the same said identifier and judges whether it is possible to join together the plurality of different partial data, from the head positions of said partial data and the sizes of said partial data; and
    in case said second terminal has carried out a joining of said partial data together, on the basis of said judgment, it judges whether it has received all of said data, from the total sizes of said joined partial data and said data, and in case it has received said all of said data, it transmits a completion report to said first terminal.

12. A network system according to claim 1, wherein:
    said first and second terminals report to said relay terminal that they are respectively the first and second terminals; and
    said relay terminal sets said expectation with respect to said first and second terminals, on the basis of said report.

13. A network system according to claim 1, wherein:
    said first terminal or said relay terminal stores a history of the communication devices in the surrounding region with which communication is possible; and
    when said first terminal selects said relay terminal, selects with priority that communication device in the surrounding region with which communications have newly become possible.

14. A network system according to claim 13, wherein:
    said relay terminal sets the expectation of said relay terminal on the basis of the frequency with which said second terminal appears in said history.

15. A network system according to claim 1, wherein:
    said first terminal transmits, together with said data, a certificate in relation to said data; and
    said relay terminal judges the validity of said certificate and said first terminal, and, on the basis of said judgment, judges whether it will carry out relay of said data.

16. A network system according to claim 1, wherein:
    said first terminal sets expectation of said relay terminal, on the basis of the movement direction of said relay terminal.

17. A network system according to claim 16, wherein:
    said first terminal receives, from said relay terminal, information indicating the situation of movement of said relay terminal and, on the basis of said information, judges whether said relay terminal is moving in the direction of said second terminal.

18. A network system according to claim 16, wherein:
    said first terminal judges, on the basis of the radio field intensity emitted from said relay terminal, whether said relay terminal is moving in the direction of said second terminal.

19. A network system according to claim 16, wherein:
said first terminal saves position information about said second terminal,
receives position information about said relay terminal from said relay terminal,
obtains the angle between the movement direction of said relay terminal and a straight line joining the position of said second terminal and the distance between said relay terminal and said second terminal on the basis of position information about said relay terminal and said second terminal, and,
on the basis of said angle and distance, judges whether said relay terminal is moving in the direction of said second terminal.

20. A network system according to claim 19, wherein:
said first terminal, in case said distance exceeds a threshold value, gives priority to said angle and computes a value for selecting said relay terminal and, in case said distance is equal to or smaller than the threshold value, gives priority to said distance and computes a value for selecting said relay terminal.

21. A network system according to claim 16, wherein:
said relay terminal, if it receives said data from said first terminal, transmits, to said first terminal, information indicating that said data have been received from said first terminal.

22. A network system according to claim 21, wherein:
said first terminal, in case it has not received information from said relay terminal indicating that said first terminal has received said data from said first terminal within a fixed time period, carries out a retransmission and,
in case it has received said second information item from said relay terminal within a fixed time period, sets a retransmission timeout value.

23. A network system according to claim 22, wherein:
said relay terminal transmits said data to said second terminal;
said second terminal, if it receives said data from said relay terminal, transmits information to said relay terminal indicating that it has received said data from said relay terminal; and
said relay terminal, if it receives said information, transmits said information to said first terminal.

24. A network system according to claim 23, wherein:
said first terminal sets the validity limit occurring in said data format and the timeout value occurring in the data transmission process in the interval elapsing until the information indicating that it has received said data from said relay terminal arrives.

25. A network system according to claim 16, wherein:
said first terminal computes the time during which it can communicate with said relay terminal and,
in case it has judged that it can complete transmission of said data unit to said relay terminal within said computed time, attempts data transmission and, in case it has judged that it cannot complete the transmission, attempts a halt of the transmission or attempts transmission of other data.

26. A network system according to claim 25, wherein:
the time during which communication with said relay terminal is possible is computed on the basis of at least one of: the situation at the time of transmission, communication parameters, and information about the transmission success record.

27. A network system according to claim 16, wherein:
said relay terminal, in case it has judged that said relay terminal is moving away from said second terminal, transmits said data to another terminal and, in case it has judged that said relay terminal is not moving away from said second terminal, saves said data in said relay terminal.

28. A network system according to claim 17, wherein:
said first information item includes at least one of: sensor information, position information, the movement history of the terminal, the target location history, and the history of connection with a communication base station.

29. A network system according to claim 16, wherein:
said first terminal changes the data transmission method at the time of data transmission on the basis of said situation information such as the positions of the terminal itself and other terminals, in case the distance between said first terminal and said second terminal is equal to or smaller than a threshold value.

30. A network system in which a first and a second terminal carrying out radio communications are connected via a cellular phone network, wherein:
if said first terminal determines that there is no communication path between said first terminal and said second terminal, said first terminal determines if there are one or more relay terminals which are capable of communicating with said second terminal and obtains and saves expectation values for the one or more relay terminals, said expectation values indicating probability of transmitting data to said second terminal from the one or more relay terminals;
said first terminal selects, on the basis of a first information item indicating an expectation, a relay terminal relaying data to be transmitted to said second terminal, and transmits said data, together with a first information item indicating the address of said first terminal and a second information item indicating the address of said second terminal, to said relay terminal;
if said relay terminal determines that there is no communication path between the said relay terminal and said second terminal, said relay terminal checks to determine if there are relay terminals capable of communicating with the second terminal, and obtains and saves expectation values of said relay terminals, said expectation values indicating a probability of transmitting data from said relay terminals to the second terminal;
said relay terminal selects, based on said expectation values saved by said relay terminal, another relay terminal to transmit data to said second terminal and transmits data, together with a first information item indicating an address of said relay terminal and a second information item indicating an address of said second terminal to said another relay terminal until said another relay terminal transmits the received said first information item and said second information item, and said data, to said second terminal; and
said second terminal, if it receives said first and second information items, and said data, transmits a completion report to said first terminal, via said cellular phone network.

* * * * *